Patented Apr. 20, 1954

2,676,107

UNITED STATES PATENT OFFICE 2,676,107

METHOD OF PRESERVING MEAT

Harold J. Hestnes, Wrentham, Mass.

No Drawing. Application July 19, 1950,
Serial No. 174,791

6 Claims. (Cl. 99—194)

This invention relates to preserving and freezing food products including meat, fowl, and fish and other seafood products.

When meat, including fowl, fish, shellfish and the like, is frozen, even according to the most modern heretofore known methods, a good part of the nutritive value, flavor and some of the weight of the food is lost. This is reflected in the lower general market price of frozen meats and fish products, because they are of inferior quality compared to fresh products.

When fish is frozen, particularly skinned fillets, the flesh dries out somewhat even during a short storage period. During longer storage the desiccation becomes more noticeable. Oxidation always takes place to some extent since some air will be trapped even in the most airtight wrapping materials. By far the greatest loss of nutritive value occurs as the result of loss of the nutritive liquid juice during defrosting immediately prior to use. Such juice contains a considerable amount of vitamins and fish oils, with the result that the fillet not only loses in nutritive value but also in flavor as well as in weight. These undesirable processes take place as well in the freezing of other forms of meat for instance, lobsters and crabs, fowl, and the blood meats.

My invention overcomes the above disadvantages and vastly improves the cold storage preservation of all kinds of meat and fish. It provides a greatly improved frozen food product whose flavor, nutritive value and weight are fully preserved and even improved as compared to the original product in fresh condition and which has a much higher value than food products which have been preserved by presently known methods and at a cost which is slight compared to the benefit provided, while preserving the present economic advantages of cold storage products with a consequent net economic gain.

In the following description and claims the use of the word "meat" is intended not only to cover the so-called blood meats but also the meat of fowl and of fish and other seafood products, particularly lobsters.

A better understanding of the problem of preserving meat by freezing and its solution according to the present invention may be had by a consideration of the structure of the meats involved. Such means are comprised of minute microscopic cells containing protoplasma formed of colloidal substances including proteins, lipids (fatty substances), and inorganic salts in water solution. The concentration may be about 80% water. The protoplasma is surrounded by a membrane through which water and smaller particles can penetrate, but no colloidal substances. The protoplasmic cells are surrounded by protein solution (blood) which rest at an equilibrium with the solution in the protoplasmic cells. The burden of establishing osmotic equilibrium (equal concentration) between the solution in the cells and the surrounding solution falls mainly upon the water which penetrates the dividing membrane by osmosis with ease. Consequently there are two osmotic units one inside the membrane (the protoplasma) and one outside the membrane (the blood) which in a balanced condition hold an equal percentage of water. If a protoplasmic cell is placed in an unbalanced solution in which the concentration of water is drastically different than that of the protoplasma, so great a quantity of water will enter or leave the protoplasma cell that the living structure of the cell is destroyed.

When a fillet of fish is dipped in plain water the water penetrates the flesh structure and the equilibrium between the two osmotic units (cell and blood) is immediately upset. The concentration of water outside the cell will be greatly increased and to reestablish equilibrium the cell will have to absorb much more water as the result of which the cell membrane may be ruptured particularly during or after freezing with a general breakdown of the cells as a result.

When the cells break down, certain chemical reactions and radical changes in the structure of the meat take place which affect flavor and nutritive value unfavorably. The various vitamins, proteins, liquids and inorganic salts from the cells are dispersed into the surrounding solutions and thence, by diffusion, into the surrounding water and are lost and also amino acids are formed and released which seriously affect the flavor of the meat and in an extreme condition of generation of amino acids the meat tastes and smells rancid or rotten. Meat products particularly fish, have a "fresh" taste when cooked immediately because the cells are unmolested and unbroken if eaten immediately after cooking. However, when such meat is frozen in water either by a slow freezing or particularly by a quick freezing process the meat structure may be fairly well preserved while the fish remains frozen but when defrosted the water medium acts adversely upon the cell structure with a consequent loss in flavor and weight and nutritive value as occurs in the heretofore known freezing processes.

However, when a fish fillet is dipped or submerged in a colloidal solution having a considerably lower water concentration than that of the osmotic units of the meat which is surrounded by the solution then the protoplasmic cells of the meat have to give off more water to come to an osmotic balance with the surrounding solution because the protein cannot penetrate the membrane. The cells will in this case shrink in volume and will not tend to burst and break down and disintegrate the flesh as in the condition where the surrounding water is in excess as above. When the fish fillet is immersed in a solution having a water concentration at least as low as or preferably less than that of the natural osmotic units of the fish then the osmotic condition is either balanced or unbalanced in favor of preservation of the cellular structure and the cellular structure of the meat is preserved and no loss of liquid occurs. If the meat is frozen in such a medium, then when it is defrosted there is no loss in flavor, nutritive value or weight and if the natural nutritive ingredients proteins, liquids and inorganic salts of the meat being preserved are also present in excess in the surrounding medium in which it is frozen then there are further advantages in that the natural flavor and nutritive value of the meat is increased rather than diminished during the preserving process because these valuable substances are absorbed by the flesh rather than dispersed by it.

It is this favorable condition of preservation by freezing which my invention provides as will be further described.

In preserving fish according to my invention I extract the proteins and lipids in a colloidal solution from waste parts of the fish, for instance the carcass after the fillets have been cut away from it, and which are ordinarily thrown away or used for purposes other than food in which they have a greatly reduced value. This applies in the case of such common fish as haddock, cod and red fish, for instance. When processing lobster or crab I use the bodies, knuckles and other parts of the shells which are wasted. Since the fish like haddock and cod are cheaper than lobsters I may extract from them only the parts which are most suitable for my purpose, that is the lipids, sodium and organic salts which already exist in solution in the flesh. In this case I do not go to the extent of breaking down the fibrous structure of the fish meat.

The extract of fish meat is obtained most easily by heating the fish under pressure which may be as high as 20 atmospheres for about three-quarters of an hour at a temperature of 100 to 125° C. The pH should not reach such a degree of alkalinity that the fats are hydrolyzed to the extent that glycerol and fatty acids are liberated. After the fish waste is cooked a yellowish transparent solution is strained off containing the lipids, hydrolyzed proteins, inorganic salts and such bony constituents as were easily dissolved or hydrolyzed. This solution is now condensed until the condensation of the particles suspended in water is considerably higher than that of such suspension within the protoplasmic cells of the live fish and in turn with the solutions surrounding the cells and which were in osmotic balance with the solutions within the cells. These latter solutions in the fresh meat may have a water content of approximately 80% and the extracted solution should have a water phase of less than that of these liquids and preferably 50% or less although a higher water percentage can be used as long as a colloidal solution is produced which is capable of undergoing gelation on cooling. The optimum effect is obtained with the highest concentration of solution which at a temperature of around 80° F. has a viscosity such that it flows freely. Where a solution having a higher water content is used a gelling agent may be added to the liquid.

The temperature of the liquid is adjusted so that it has the viscosity of a soup. The fish meat in the form of fillets or otherwise may now be dipped in the solution or immersed therein for a few seconds or long enough to permit osmosis and diffusion of the liquids to take place so that an equilibrium is reached between the internal liquids of the fish meat and the solution in which it is immersed. When the fish is left for awhile in the solution the natural juices in the meat may be greatly increased in concentration and cannot easily escape from the fillet and when the meat is then removed from the extract solution a surface coating is left on the outside in the form of a gel of the extract solution which is obtained by immersing the meat at a lower temperature than that of the solution or by otherwise adjusting the gelling properties or the temperature of the solution so that gelation of the surface coating is obtained when the meat is withdrawn from the liquid.

The surface coating gel on the meat continues to behave according to the principles of diffusion and osmosis. If the coating has a higher concentration than that of the internal liquids the solution outside of the cells will lose some of its water phase to the coating material until equilibrium is reached between the two, but now the total solution outside of the protoplasmic cells is out of osmotic balance with the solution inside which therefore gives off some of its water with the result that a hypertonic condition of the internal solution is obtained with a consequent shrinkage of the protoplasmic membrane. In this condition the cells can stand the expansion caused by freezing or defrosting of the meat and the surface coating envelope without rupture and consequently the meat is not broken down as is the result of ordinary freezing when the protoplasmic cells usually burst either during freezing or defrosting with the result that the fish has a mushy texture and the flavor is reduced by the time it is ready for use.

The concentrated solution of the surface coating gradually penetrates the flesh by diffusion. The colloidal nature of the coating solution prevents the colloidal particles inside the fish from escaping either before freezing or when the meat is defrosted. In any event the escape is very small and depends upon the concentration of the solution. Whatever extrudes is principally water which may sweat through the gelation and escape without harmful effect. The surface coating not only retains the proteins and liquids in solution in the meat but those of the surface coating are also added to the natural liquids in the fish so that the meat is consequently substantially enriched in flavor and nutritive value. Also the weight of the meat is increased. Meat treated in this manner may also hold a much higher percentage of fats which may be increased to as much as three times that of the original fresh fish. It is therefore possible to fry such meat without the use of added butter or other fat.

The difficulties heretofore encountered in freezing lobster meat comprise another instance of a food preservation problem which is solved by the present invention. As is well known to anyone who has tried to freeze lobster meat and thereby preserve it the meat becomes dry and tough and loses its flavor after having been frozen for only a very few days and for the above mentioned reasons. Since lobster meat is expensive it is practical in carrying out the process of my invention to extract everything having food value from the bodies, shells, claws and the knuckles which are ordinarily wasted when lobster meat is extracted by the usual methods. As distinguished from my preferred practice in the case of fish meat or fish, the fibrous structure of the lobster meat may be all broken down to a liquid state and thereby extracted from the shell since it is impractical to extract the waste meat from the shells mechanically. However, for some purposes of use of the meat it may be preferable to preserve some of the fibrous structure of the meat, as for the sake of appearance or to "stretch" the meat being preserved.

Therefore I crush the shells into small particles by any suitable mechanical means, such as a grinder or crusher and I add water to form a somewhat liquified mass. To this is added, an enzyme, preferably a proteolytic enzyme such as trypsin or eripsin which is capable of digesting the proteins in the mass. Preferably the pH is raised or held to about 8.0 or 8.5 as by the addition of soda or the like and temperature is applied between 100 and 125° F. The mass is now stirred slowly. The amount of enzyme used may vary preferably from one-half to one percent of the protein content but can vary to a greater extent. The proteins will now be rapidly hydrolyzed and everything except parts of the shells and some of the membrane is reduced to a liquid. In some cases as mentioned above I may prefer to stop the digestion before the meat fibers are entirely broken down as it may be of commercial advantage in the ultimate use of the product that the fibers are visible.

I have found that the use of proteolytic enzyme (proteose) is advantageous because it causes only a mild digestion in which only a small amount of free nitrogen is liberated. Aminos add a bitter flavor to the food which is objectionable and the natural fresh lobster flavor disappears when the aminos are present in more than a small quantity.

When the ground lobster liquidated mass has been digested to the desired point I raise the temperature to boiling to destroy the enzymes and to minimize the bacterial action.

The undissolved contents of the mass such as the bone particles are separated out as by straining or treatment in a centrifuge leaving a more or less liquid solution of proteins, lipids and salts and such other minerals as are found in lobster meat and the solution may also contain a large percent of comparatively coarse fiber material giving the extract a fibrous body. The flavor of this extract is a very delicate lobster taste and it has a high nutritive value.

The lobster meat to be frozen such as the whole meat from the tails and claws is now immersed in this extract so that the meat is entirely covered in an envelope of the liquid. It usually requires a proportion of about one part of the liquid envelope to two parts of the lobster meat to give the meat full protection depending upon the container used. The lobster meat and the liquid in which it is immersed is now frozen in the usual way.

The liquid extract surrounding the lobster meat entirely protects the meat from the effects of oxidation or transmutation. The juice is absorbed by the meat as in the case of fish according to the laws of diffusion and osmosis. Lobster meat frozen in this manner may be preserved for months without undergoing any change and when defrosted and used it is even more tasty than the original fresh lobster meat because of its greater juiciness. Furthermore the juice extract supplements the use of the lobster meat in many dishes adding to its flavor and "stretching" the meat. For instance, the extract is suitable for use in lobster salads or when diluted and further prepared as a base for lobster bisque.

The lobster extract forming the envelope in which the meat is frozen may be prepared in many various ways without exceeding the scope of this invention. It is thereby possible to freeze and preserve lobster meat in a satisfactory manner which could not be done before and also the food product is improved in flavor, nutritive value and weight and the cost of such meat is thereby reduced.

The process of the invention specifically illustrated herein as applied to the preservation of fish and lobster is equally applicable to the meat of fowl and to the blood meats such as beef, lamb and the like.

I claim:

1. Method of preserving meat comprising freezing the meat in contact with a liquid product of at least partial hydrolysis of a similar meat product.

2. Method of preserving meat comprising freezing the meat in contact with a liquid product of at least partial hydrolysis under substantially alkaline conditions of a similar meat product.

3. Method of preserving meat comprising freezing the meat in contact with a liquid product of hydrolysis of a similar meat product, said hydrolysis being short of a general breakdown of the fibers of said similar meat product.

4. Method of preserving meat comprising freezing the meat in contact with a partially condensed liquid product of hydrolysis of a similar meat product, the concentration of the suspended matter in said liquid product being at least equal to the concentration of similar matter in the protoplasmic cells of the said meat when living.

5. Method of preserving meat comprising freezing the meat in contact with a liquid product of hydrolysis in the presence of a proteolitic enzyme of a similar meat product.

6. Method of preserving meat comprising extracting a liquid product of hydrolysis of similar meat product, condensing said liquid so that it is capable of forming a gel, gel coating said meat by dipping said meat in said liquid while said meat is at a lower temperature than said liquid and freezing said meat and gel coating.

References Cited in the file of this patent

UNITED STATES PATENTS

| Number | Name | Date |
|---|---|---|
| 2,050,004 | Goren | Aug. 4, 1936 |
| 2,290,854 | Hoy | July 28, 1942 |
| 2,419,877 | Birdseye | Apr. 29, 1947 |
| 2,504,869 | Noyes | Apr. 18, 1950 |

FOREIGN PATENTS

| Number | Country | Date |
|---|---|---|
| 350,758 | Great Britain | June 18, 1931 |
| 23,797 | Australia | July 20, 1936 |